(12) United States Patent
Mahle et al.

(10) Patent No.: US 8,511,519 B2
(45) Date of Patent: Aug. 20, 2013

(54) PET FOOD DISPENSER

(76) Inventors: Michael S. Mahle, Fairport, NY (US); Craig Rubino, Allston, MA (US)

(*) Notice: Subject to any disclaimer, the term of this patent is extended or adjusted under 35 U.S.C. 154(b) by 0 days.

(21) Appl. No.: 13/402,468

(22) Filed: Feb. 22, 2012

(65) Prior Publication Data
US 2012/0210940 A1  Aug. 23, 2012

Related U.S. Application Data

(63) Continuation of application No. 12/327,014, filed on Dec. 3, 2008, now abandoned.

(60) Provisional application No. 61/012,157, filed on Dec. 7, 2007.

(51) Int. Cl.
*G01F 11/00* (2006.01)

(52) U.S. Cl.
USPC ........... 222/386; 222/309; 222/319; 222/388; 222/434; 222/438

(58) Field of Classification Search
USPC ............. 222/198, 280, 309, 319, 386, 388, 222/393, 434, 438, 448
See application file for complete search history.

(56) References Cited

U.S. PATENT DOCUMENTS

| | | | |
|---|---|---|---|
| 1,815,468 A * | 7/1931 | Favro | 222/439 |
| 4,867,353 A | 9/1989 | Jacek | |
| 5,088,620 A | 2/1992 | Kelliher et al. | |
| 5,458,232 A | 10/1995 | Novak et al. | |
| 6,269,285 B1 | 7/2001 | Mignault | |
| 6,611,986 B1 | 9/2003 | Seals | |
| 6,644,493 B1 | 11/2003 | Walton et al. | |
| 7,004,111 B2 | 2/2006 | Olson | |
| 7,090,092 B1 | 8/2006 | Roebuck, Jr. et al. | |
| 2005/0121868 A1 * | 6/2005 | Hartman et al. | 280/47.26 |
| 2006/0159815 A1 | 7/2006 | Crook et al. | |

* cited by examiner

*Primary Examiner* — Jason Boeckmann
(74) *Attorney, Agent, or Firm* — Hiscock & Barclay, LLP; Peter J. Mikesell

(57) ABSTRACT

The apparatus of the present invention is a pet pantry having storage containers for pet-related equipment, accessories, medication, or other items, and also pet food storage and dispensing. The food dispensing mechanism allows for measured food dispensing, providing volume adjustment mechanisms to dispense a desired quantity of pet food. The food dispensing mechanism is a single movement handle or button dispensing the desired quantity of food. The pet pantry is also modular allowing for adjustments to a pet owner's specification.

13 Claims, 9 Drawing Sheets

PET FOOD DISPENSER

CROSS-REFERENCE TO RELATED APPLICATIONS

This applications is a continuation of U.S. patent application Ser. No. 12/327,014 filed Dec. 3, 2008, which claims priority from U.S. Provisional Patent Application Ser. No. 61/012,157, filed Dec. 7, 2007, the specifications of which are incorporated herein in their entirety.

FIELD OF THE INVENTION

The present invention relates to an integrated pet food storage, retrieval, measurement, and dispensing system. It provides a convenient means for feeding pets, particularly, but not limited to, dogs and cats, while also storing pet supplies and accessories.

BACKGROUND OF THE INVENTION

Increasingly, daily life has become considerably more fast-paced and activity driven. People welcome the chance to make a daily routine more convenient, and one's life a little easier. Dog owners are no exception. Pet foods and supplies have always presented challenges in both storage and use. Dog food, as an example, can be a nuisance to store and scoop out. Similarly, pet accessories and toys are easily misplaced or left lying around when not in use.

Various storage products exist for pet food. Generally, these products consist of a plastic bin with a cover, sometimes with wheels making the bin portable. There are also products used to store pet supplies—mostly toys in a toy storage bin. Few combine food and supply storage in one entity. Some of these products provide a method for storing and raising pet food so it may be scooped. Other storage containers dispense food at a floor level.

None have an automated, integrated system that provides a countertop height convenience of storing, measuring, and dispensing of pet food while also including storage compartments for pet supplies and accessories, some of which are child-resistant.

Therefore, a device having refillable pet food storage chambers or multiple chambers that can automatically raise food within the chamber and automatically fills a food measurement compartment is desired.

Further, a device that can measure and dispense certain volumes of food is desired.

A device that contains a low food indicator or window and a removable liner for the food storage chamber is also desired.

Moreover, a device that contains both food and accessory storage compartments with child-lock features is desired.

Last, a device that is ergonomically designed including the above features with aesthetic appeal is desired.

SUMMARY OF THE INVENTION

The invention comprises, in one form thereof, an apparatus for pet food and pet-related item storage comprising: a food storage chamber; a means for raising food in the food storage chamber; a food measurement compartment; a food chute; a means for adjusting volume in the food measurement compartment; a food dispensing handle; a shut off cover; and a item storage compartment.

More particularly, the invention includes a compression spring for elevating the food, and a dial and gear adjustment assembly for food measurement.

In another form, the invention includes a method for dispensing pet food comprising the steps of: providing pet food in a food storage chamber; elevating food into a food measurement compartment; moving a food dispensing handle having a food chute release activator towards a food chute release; extending a shut-off cover; engaging the food chute release and the food chute release activator; and moving the food dispensing handle engaged with the food chute release to open a food chute.

An advantage of the present invention is that the apparatus provides for storage of pet food that may optionally contain a removable storage liner, measuring of a desired quantity of pet food and then allowing for easy movement of a handle to dispense the measured quantity of pet food.

A further advantage of the present invention is that the pet pantry contains multiple storage containing units to house pet related equipment, accessories, toys, medications, and other items, and can also have child resistant features.

An even further advantage of the present invention is that the pantry can contain multiple storage and dispensing units within one pantry to house multiple types of food for owners having various types of pets requiring different types of pet food.

Yet another advantage of the present invention is that the pet pantry is conveniently sized so that the food is dispensed at a level convenient for adults, and also can include a low food indicator to alert the pet owner to refill the food.

BRIEF DESCRIPTION OF THE DRAWINGS

The present invention is disclosed with reference to the accompanying drawings, wherein.

Corresponding reference characters indicate corresponding parts throughout the several views. The example set out herein illustrates one embodiment of the invention but should not be construed as limiting the scope of the invention in any manner.

DETAILED DESCRIPTION

Figure 1:
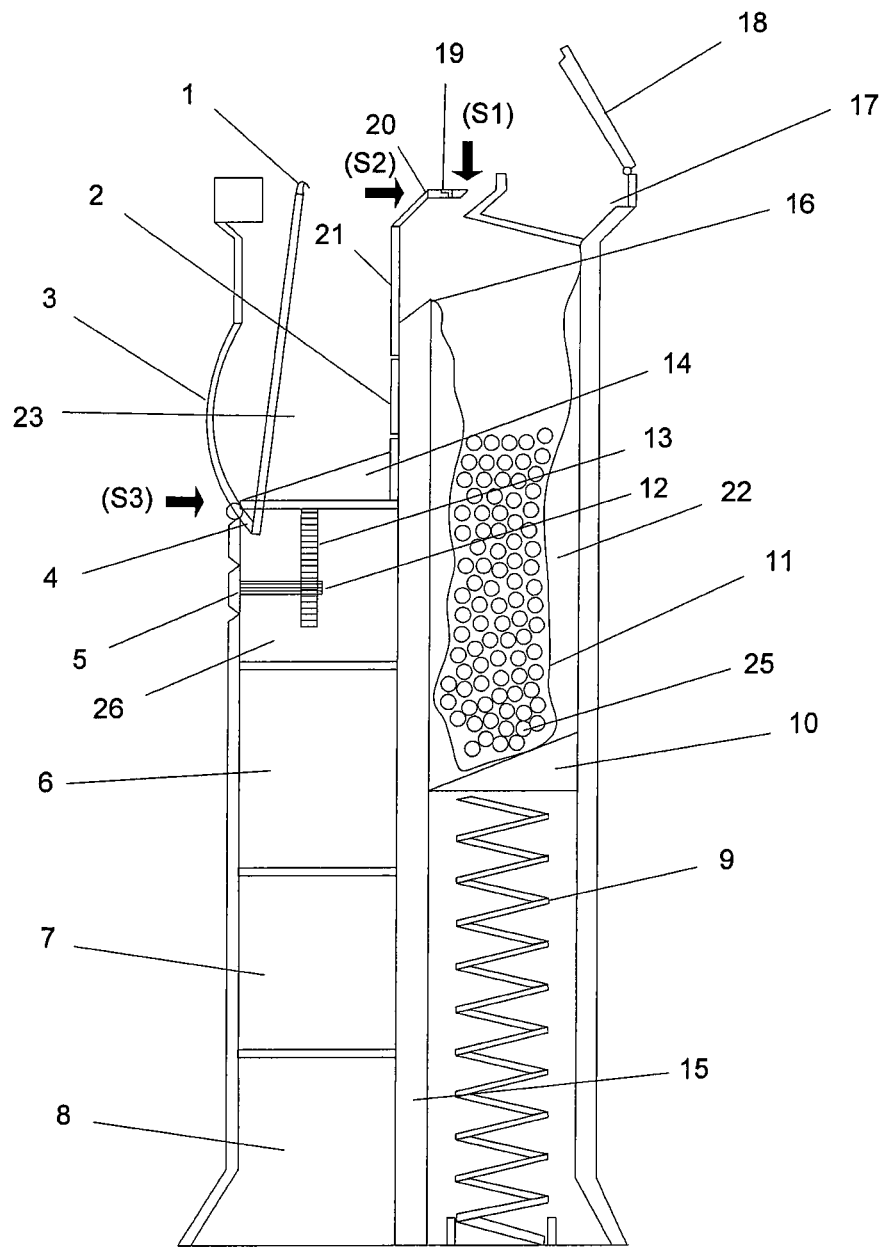
FIG. 1 is a cross-sectional view of the present invention.
Figure 10:
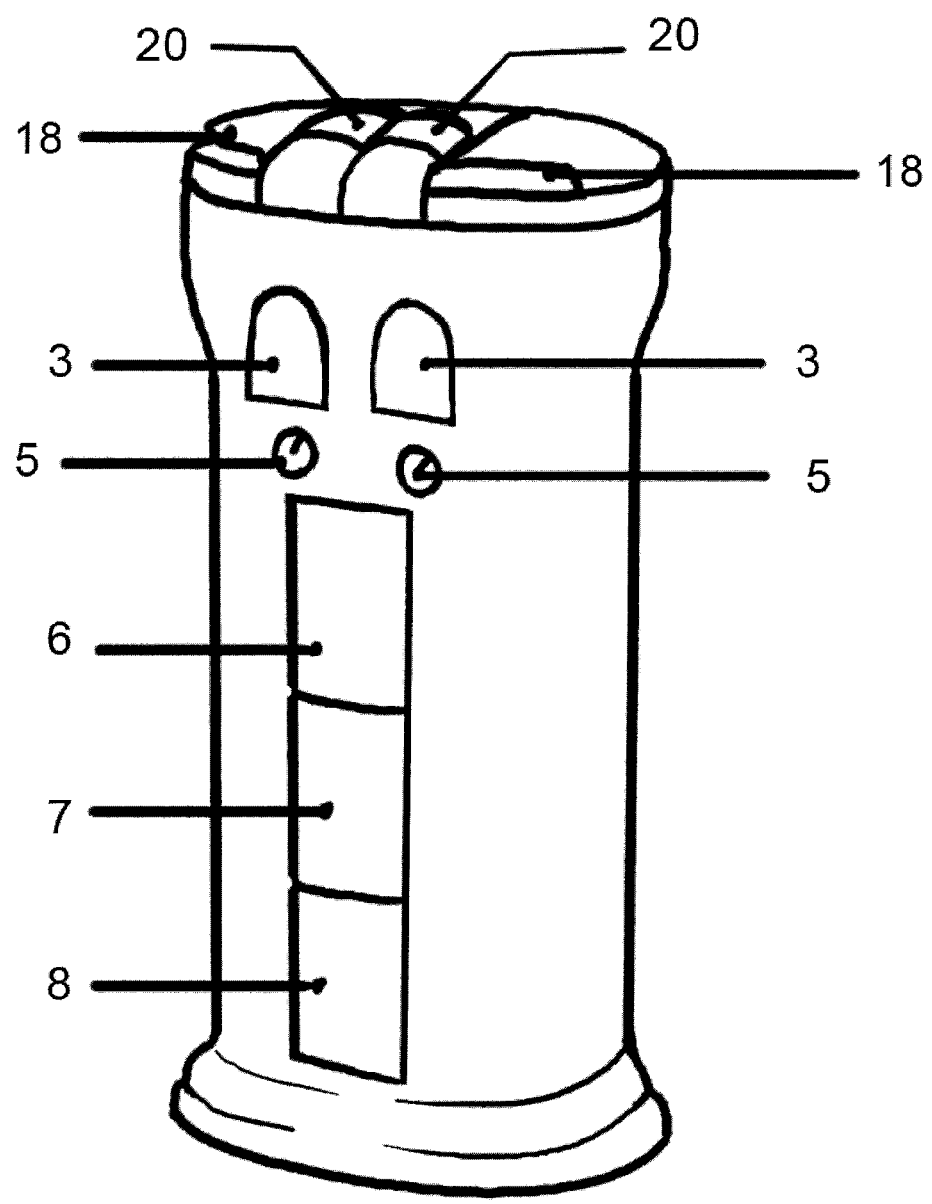
FIG. 10 is an isometric view of the present invention having two storage chambers and food chutes.

FIG. 1 shows a cross-sectional view of the pet pantry 100. The pet pantry 100 has a food chute release 1 that enables the food chute 3 to open and dispense food in the food measurement compartment 23. The pet pantry 100 also has divider 15 running between the food measurement compartment 23 and storage compartments 6, 7, 8 and the food storage chamber 22. It is also noted that the storage compartments 6, 7, 8 may be replaced with other units or toys for the pet. For instance, the pet pantry 100 may contain a scratching post or other devices attached in place of storage containers. While FIG. 1 only depicts a single food storage chamber 22, it should be noted that the pet pantry 100 may have multiple storage chambers for various types of pet food (as shown in FIG. 10) either with multiple measuring compartments and chutes or with a single measuring compartment and chute operating between the storage chambers. Furthermore, the food dispensing handle 20 itself may have a lock to prevent undesired food dispensing along with various child resistant features to prevent tampering with the pet food and other items by young children. The divider 15 between the measurement compartment 23 and storage chamber 22 is adjacent to the food dispensing handle 20, which is connected to the shut-off cover activator 21 and shut-off cover 2, and also has a food platform stop 16 which is used to prevent further movement of an angled food platform 10 which is in the food storage chamber 22.

The food dispensing handle 20 further has a food chute release activator 19 that, as will be explained in fuller detail below, operates the food chute release 1 to dispense the pet food. The food storage chamber 22 may optionally contain a removable food chamber liner 11. The removable food chamber liner 11 assisting in preventing unwanted debris or small food particles from falling below the angled food platform 10 in the food storage chamber 22. The angled food platform 10 in food storage chamber 22 defines the lower end of the food storage chamber 22. Under the angled food platform 10 is a compression spring 9, which elevates the food in the food storage chamber 22. At the top of the food storage chamber 22 is a food platform stop 16 used to prevent the angled food platform 10 from moving further upwards. The pet pantry 100 also contains a removable top storage console 17 and removable top storage console lid 18. The storage console 17 and lid 18 are placed in this embodiment above the food storage chamber 22. Furthermore, the storage console 17 and lid 18, may have child resistance features so that children cannot easily access the contents of the storage console 17 so that pet medications or other potentially harmful substances cannot be accessed by children. Under the food measurement compartment 23 is a measuring housing 26 which contains mechanics for the food measuring capabilities. Though the food measurement compartment 23 and measuring housing 26 are shown separately, the measuring means and food measurement compartment 23 may be incorporated into a single housing or chamber. Below the measuring housing 26, are three storage components 6, 7, 8 that can house any pet related materials.

Figure 2:
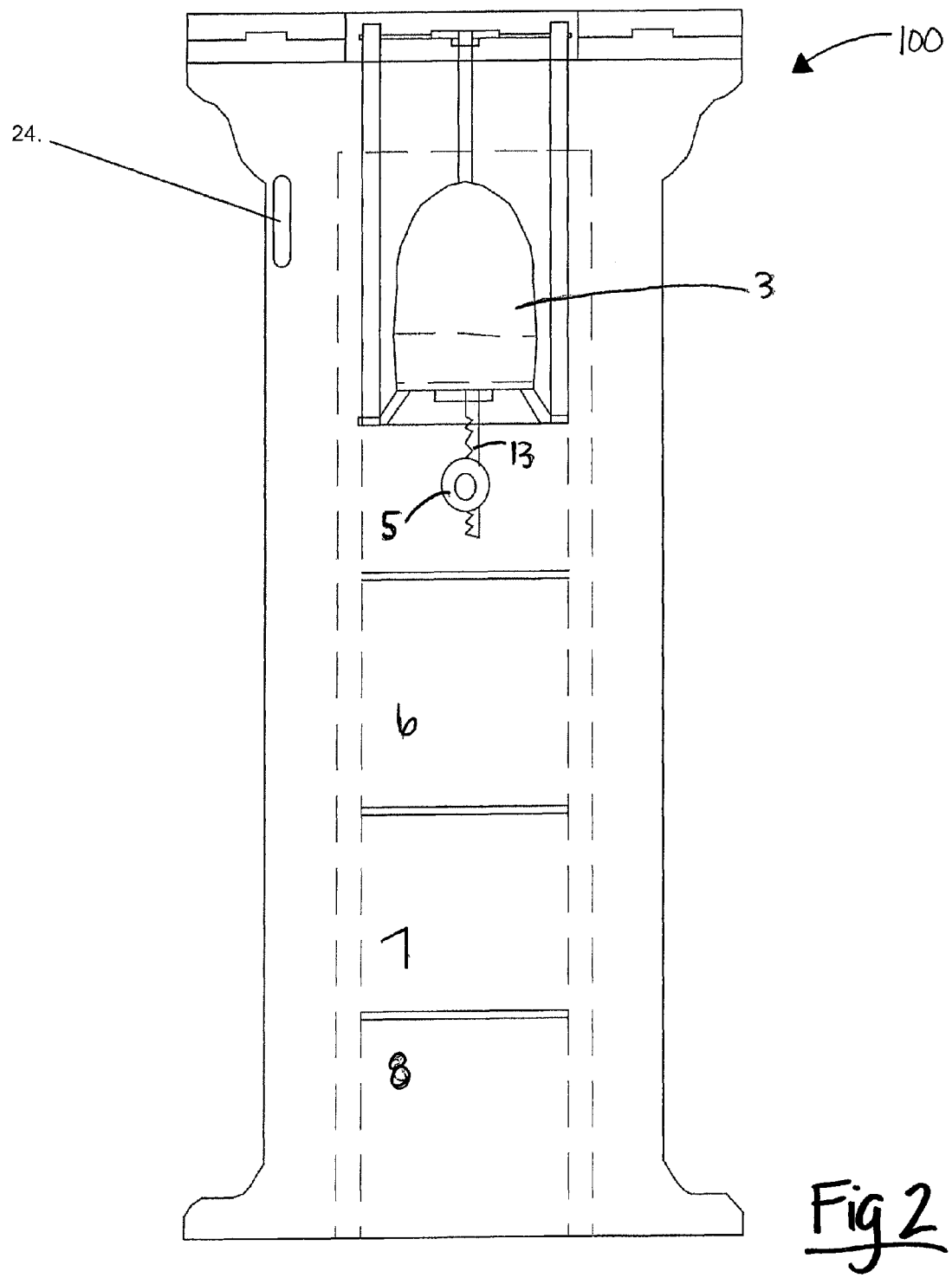
FIG. 2 is a frontal view of the present invention.

FIG. 2 shows a frontal view of the pet pantry 100. The frontal view shows the three storage containers 6, 7, 8 beneath the measuring housing 26. The selector dial 5 is on the outside of the measuring housing 26. Further, the pet pantry 100 has a food indicator 24 that shows the amount of food in the pet pantry 100, thereby indicating the need for food in the food storage chamber 22. The food indicator 24 is shown as a window into the food storage chamber 22, however, it will be appreciated by those in the art that any number of devices can be used to indicate there is low food, such as a light or sound indicator triggered by the angled platform 10 reaching a certain height or weight.

Figure 3:
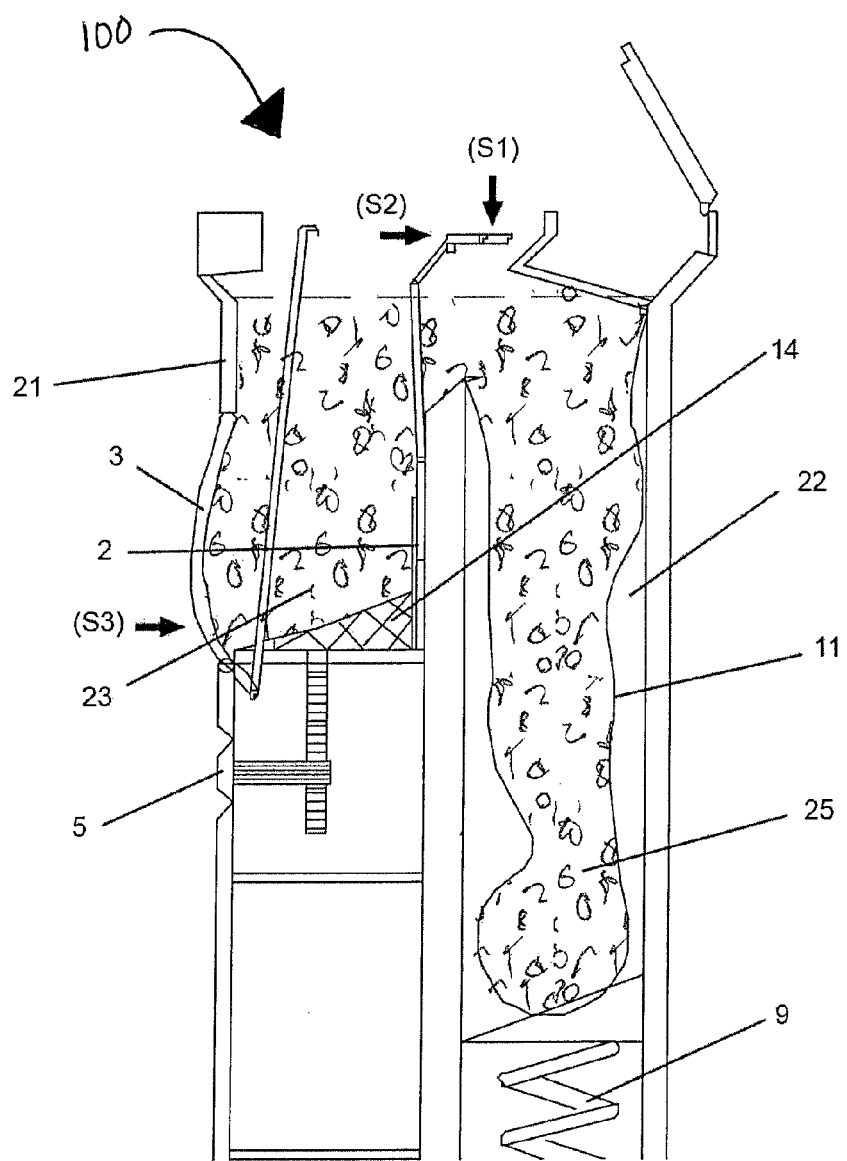
FIG. 3 is a cross-sectional view of the present invention prior to food dispensing.

As will be explained below, FIGS. 3-9 show one embodiment of the pet pantry 100. FIG. 3 shows the pet pantry 100 in the pre-dispensing position. The compression spring 9 raises the pet food 25 in removable liner 11 within the food storage chamber 22 above the food measurement compartment 23, thereby allowing food to enter the food measurement compartment 23. The food measurement compartment 23 is set to maximum volume as the food measurement compartment angled platform 14 is set on the bottom of the food measurement compartment 23. The compression spring 9 automatically elevates the pet food 25 every time food is dispensed, thus the food is always ready for dispensing. It will be appreciated by those in the art that other methods of elevation may be substituted by the compression spring, such as a hydraulic system, a pulley system, through air displacement, or an electronic or battery operated mechanism automatically elevating the food 25. As shown in FIG. 2, the food dispensing handle 20, shut-off cover activator 21, and shut-off cover 2 are fully retracted. Further, the food chute release 1 and food chute 3 are in their retracted position.

Figure 4:
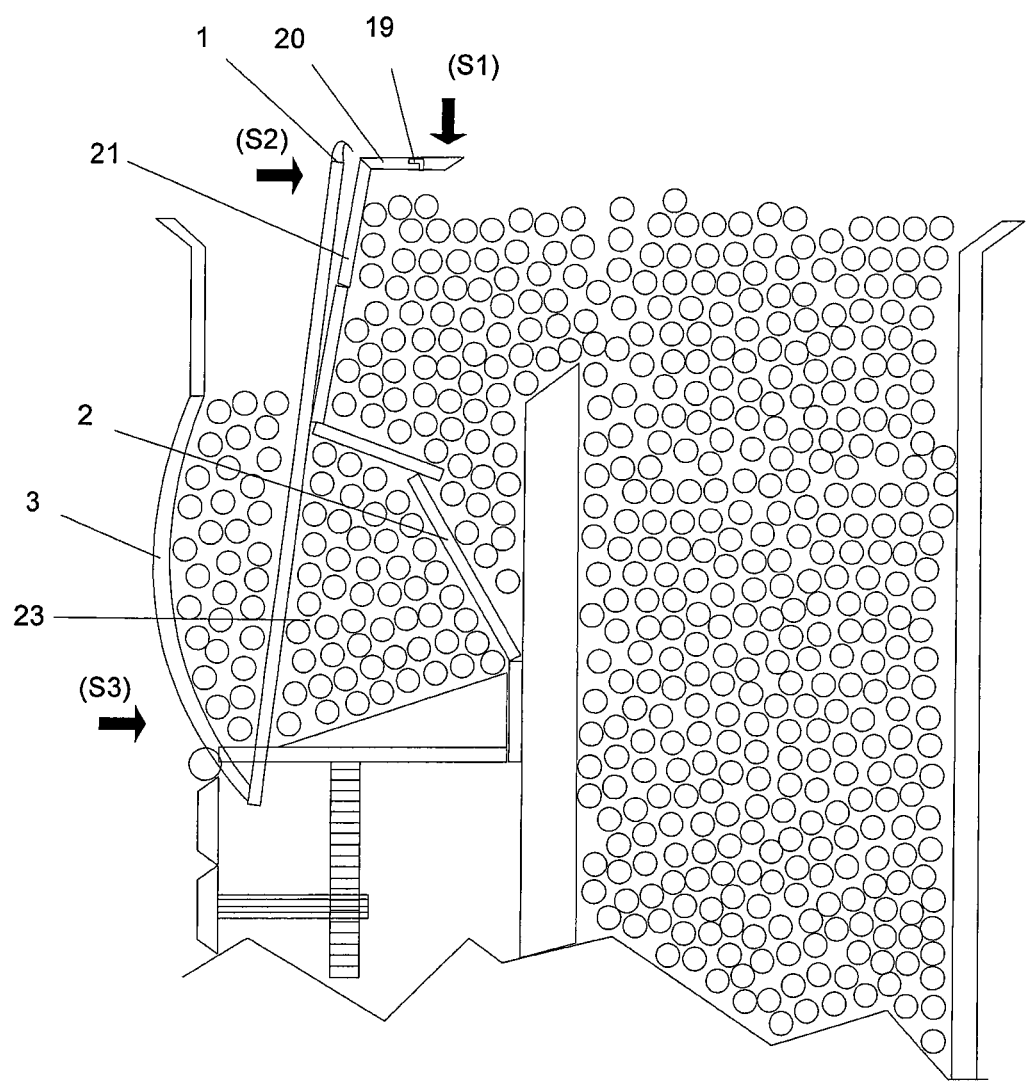
FIG. 4 is a cross-sectional view of the present invention with the food dispensing handle being engaged for food dispensing.

Moving to FIG. 4, the food dispensing handle 20 is drawn toward but not yet engaging the food chute release 1. As the food dispensing handle 20 is pulled toward the food chute release 1, the shut-off cover activator 21 moves and begins to extend the shut-off cover 2. The food dispensing handle 20, the shut-off cover activator 21, and the shut-off cover 2, are all spring-connected such that when the food dispensing handle 20 is released, the parts return to their retracted position, as shown in FIG. 3. As shown in FIG. 4, both the shut-off cover activator 21 moves and the shut-off cover 2 are partially extended as the food dispensing handle 20 is pulled toward the food chute release 1.

Figure 5:
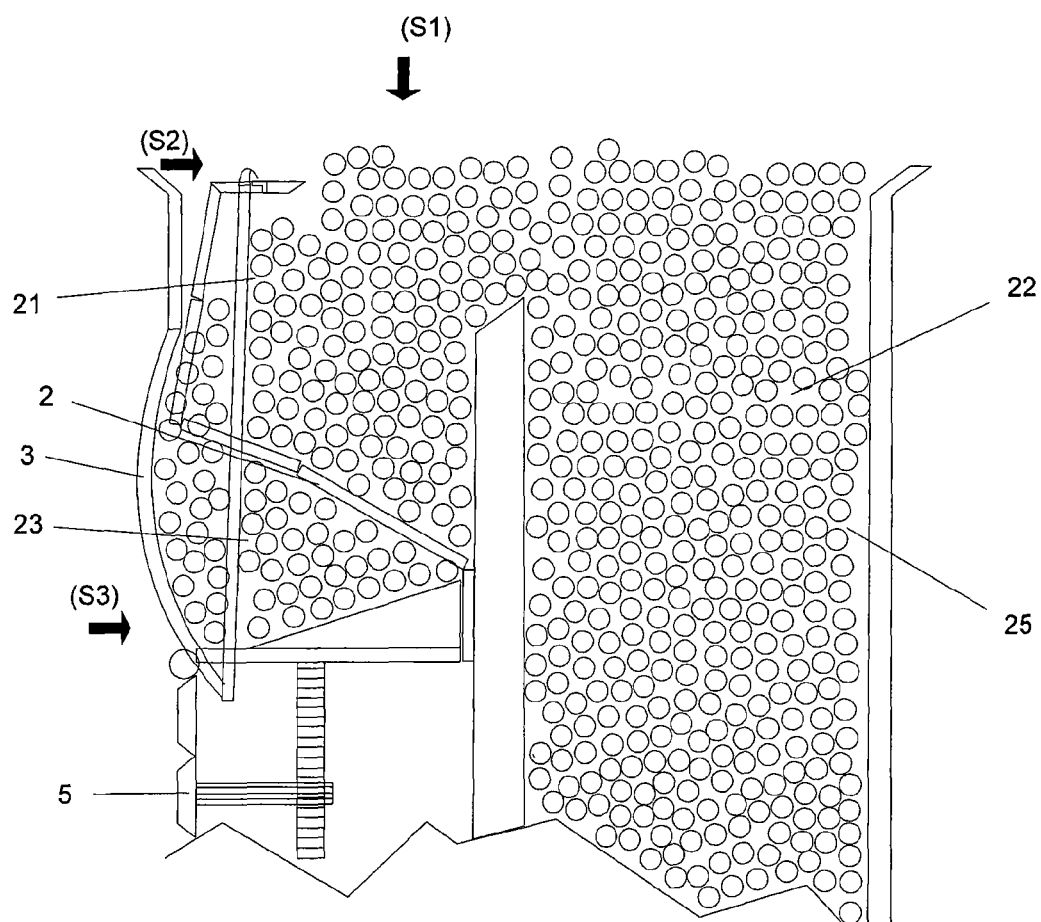
FIG. 5 is a cross-sectional view of the present invention with the food dispensing handle engaged with the food chute release.

Referring now to FIG. 5, the food dispensing handle 20 is fully extended, which in turn causes full extension of the shut-off cover 2 via the shutoff cover activator 21. When the shut-off cover 2 is fully extended, it prevents food 25 from entering the food measurement compartment 23. The shut-off cover 2 also acts as a barrier from the food in the food storage chamber 22, thereby allowing only the measured volume of food to be dispensed. Also shown in FIG. 5 is engagement of the food chute release 1 and the food chute release activator 19 on the food dispensing handle 20. The food chute release activator 19 is shown as notch in the food dispensing handle 20, however, it will be appreciated by those in the art that this engagement can be substituted by many different connections such that these two elements can be releasably attached to each other for opening of the food chute 3.

Figure 6:
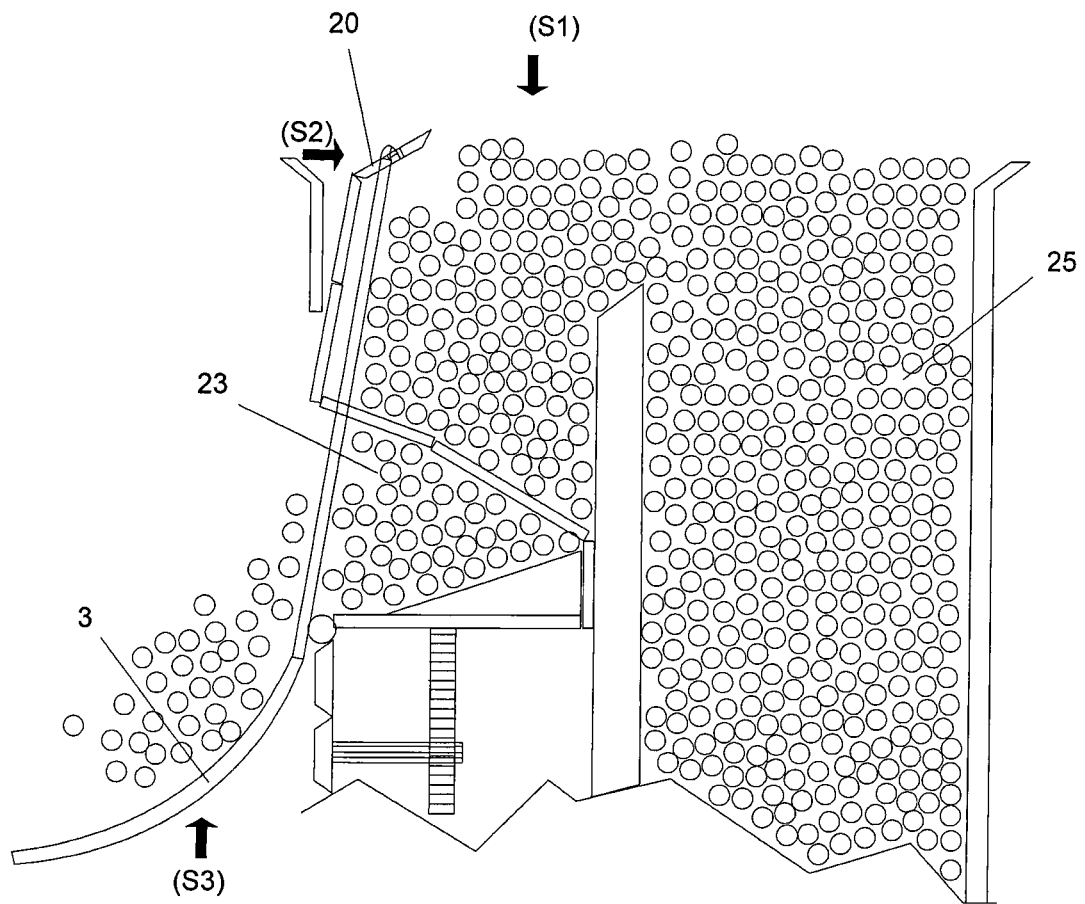
FIG. 6 is a cross-sectional view of the present invention showing food dispensing.

Referring now to FIG. 6, the food dispensing handle 20 is lifted upward moving the food chute release 1, which is still engaged to the food chute release activator 19, upward as well. When the food chute release 1 is pulled upward a spring S3 applies rotational pressure against the food chute 3 at the food chute release connector 4, thereby opening the food chute 3 to dispense the pet food 25 in the food measurement compartment 23.

Figure 7:
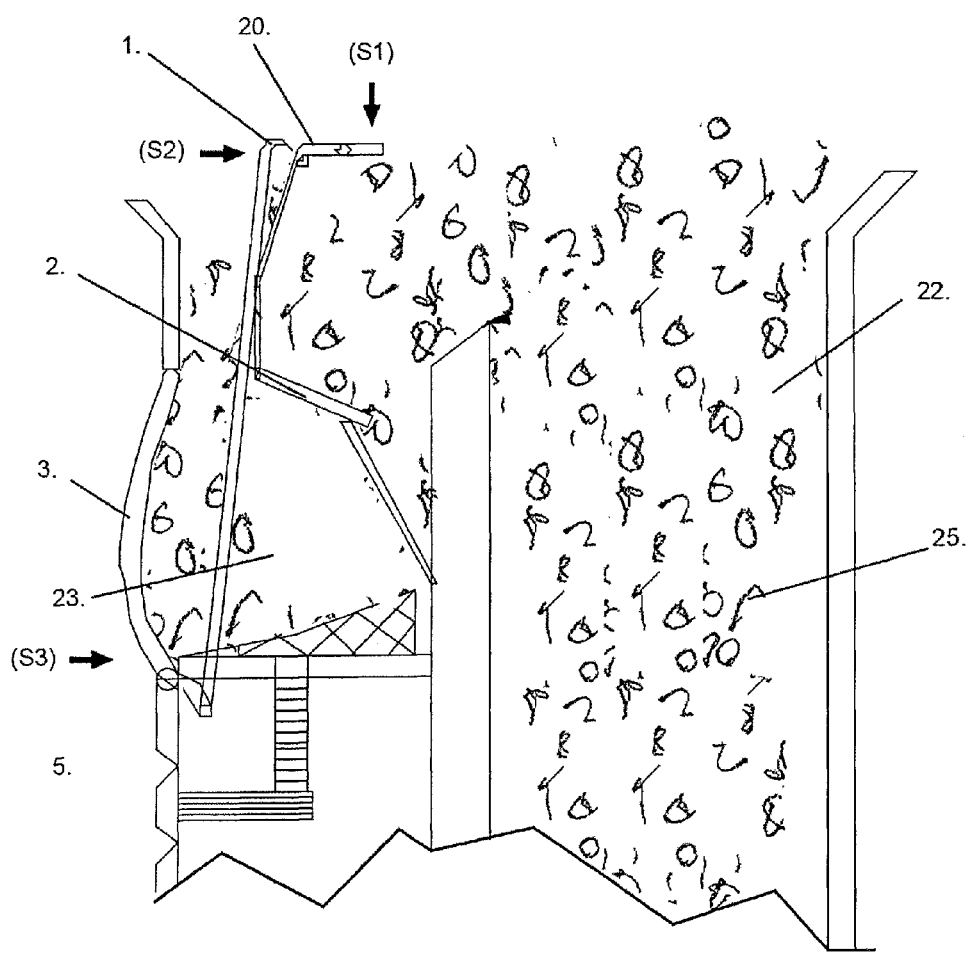
FIG. 7 is a cross-sectional view of the present invention showing the food dispensing handle returning to static position.

As shown in FIG. 7, the food dispensing handle 20 is released and disengages the food chute release 1, thereby closing the food chute 3. Further as the food dispensing handle 20 returns to its retracted position, the shut-off cover 2 and its activator 21 return to their retracted position. Once the shut-off cover 2 is retracted food 25 from the food storage chamber 22 is allowed to enter the food measurement compartment 23, so that the pet pantry 100 is ready for the next dispensing. The food 25 in the food storage chamber 22 is automatically elevated by force of the compression spring causing the food 25 in the food storage chamber 22 to enter the empty space within the food measurement compartment 23. The food dispensing handle 20 is automatically returned to its downward and retracted position by springs S1 and S2, each applying a force to retract the handle into its starting position.

As will be appreciated by those in the arts, though the embodiment explained herein contains a single movement dispensing system, other methods can be used for food dispensing. With respect to the handle movement, the handle could require a push feature instead of a pull feature or even pushed or pulled from left to right or vice versa to activate the shut-off cover 2 and to open the food chute 3. Moreover, the pet pantry 100 could have a push button feature for activating the shut-off cover 2 and cause the food chute 3 to open, thereby dispensing the food 25. The push button feature could be either an electronic or manual button causing the chute 3 to open and the shut-off cover 2 to activate. Another dispensing mechanism could include a pedal feature operating in the same manner as the handle. Moreover, the food dispensing handle 20, shut-off cover 21, and food chute release 1 could all be integrated into unitary piece performing the same functions described above.

Regarding the food dispensing action itself, other methods may be interchanged with the features described above. For instance, the food chute 3 could be opened in the opposite manner where the food chute release connector 4 is attached to the top of the food chute 3 releasing the bottom of the food chute 3. Alternatively, the food chute 3 could be placed on the side or other convenient location of the pet pantry 100. As another measure, the food chute 3 could be within the food measurement compartment and would allow for the food 25 in the food measurement compartment 23 to fall to the bottom of the pet pantry 100 into container or a lower area for easy dispensing.

Figure 8:
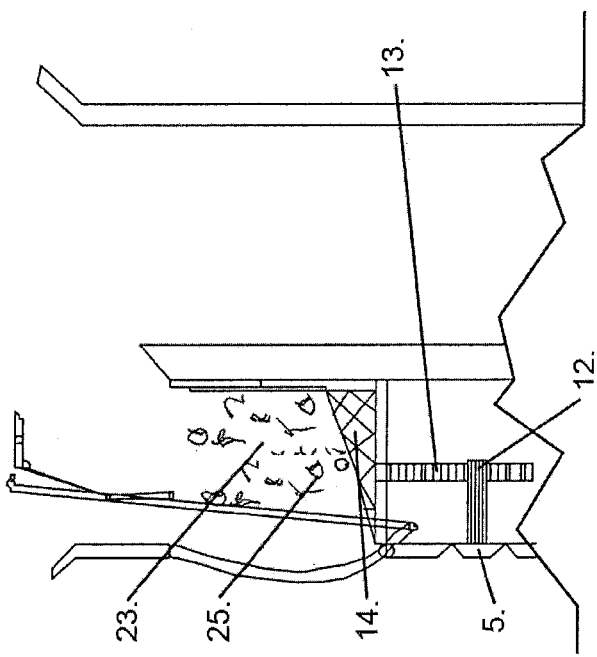
FIG. 8 is a cross-sectional view of the present invention showing the food measurement compartment at full volume.
Figure 9:
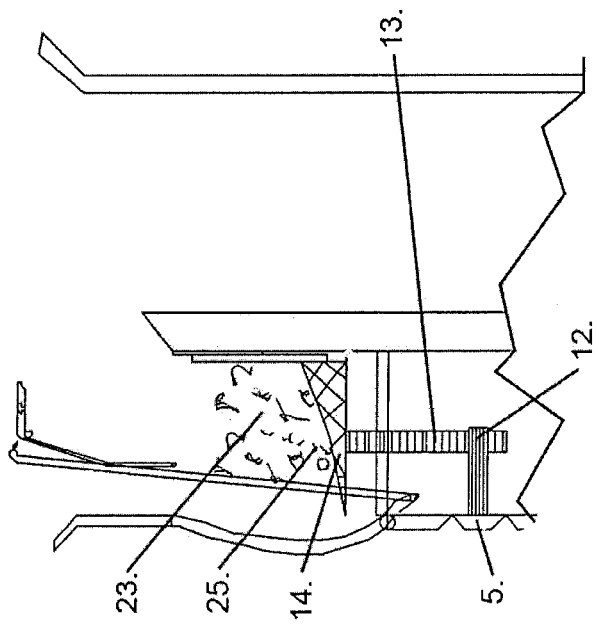
FIG. 9 is a cross-sectional view of the present invention showing the food measurement compartment being raise to lesser volume.

FIGS. 8 and 9 show a measuring means which includes a food measurement selector dial 5, the food measurement selector dial adjustment gear 12, food measurement compartment lift mechanism 13, and food measurement compartment angled platform 14. The food measurement selector dial 5 is used to set the volume of food to be dispensed and subsequently raises or lowers the food measurement compartment angled platform 14. The food measurement selector dial 5 moves the food measurement compartment angled platform 14 by using the food measurement selector dial adjustment gear 12 and the food measurement compartment lift mechanism 13. FIG. 8 shows the angled platform 14 in its lowest position, thereby providing for dispensing of the maximum volume of food. As shown in FIG. 9, when the selector dial 5 is turned to select a desired quantity of food that is less than the largest volume of food, then the selector dial 5 engages the selector dial adjustment gear 12 and the lift mechanism 13 to move the angled platform 14 upward. Other methods of volume measurement may include electronic or battery operated mechanisms to lift the platform to the desired volume or may alternatively include a lift mechanism. Furthermore, the food measurement selector dial 5, may alternatively be replaced with an electronic touch screen or knob or bar for use with other lift mechanisms.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

Parts List
100 Pet Pantry
1 Food Chute Release
2 Shut-Off Cover
3 Food Chute
4 Food Chute Release Connector
5 Food Measurement Selector Dial
6 Storage Compartment
7 Storage Compartment
8 Storage Compartment
9 Compression Spring
10 Angled Food Platform
11 Removable Food Chamber Liner
12 Food Measurement Selector Dial Adjustment Gear
13 Food Measurement Compartment Lift Mechanism
14 Food Measurement Compartment Angled Platform
15 Divider
16 Food Platform Stop
17 Removable Top Storage Console
18 Removable Top Storage Console Lid
19 Food Chute Release Activator
20 Food Dispensing Handle
21 Shut-Off Cover Activator
22 Food Storage Chamber
23 Food Measurement Compartment
24 Low Food Indicator
25 Food
26 Measuring Housing
S1 Spring
S2 Spring
S3 Spring

We claim:

1. An apparatus for pet food and pet-related item storage comprising:
   a base;
   a wall surrounding the base and extending from the base upward in a vertical direction to define an interior chamber;
   a divider inside the interior chamber and extending upward in a vertical direction to divide the interior chamber into first and second chambers, said first and second chamber extending parallel to each other from the base to the top of the wall surrounding the base, the first chamber comprising a food storage chamber and the second chamber comprising a food measurement compartment, the food storage chamber with a top opening;
   a means for raising food in the food storage chamber;
   the food measurement compartment laterally disposed relative to the food storage chamber, the food measurement compartment having a top opening that is adjacent the top opening of the food storage chamber, but laterally spaced therefrom;
   a food chute coupled to the food measurement chamber;
   a means for adjusting volume in the food measurement compartment;
   a food dispensing handle operatively connected to a shut off cover such that:
      (a) actuation of the food dispensing handle moves the shut off cover to separate the food measurement compartment from the food storage chamber and dispenses food from the food measurement compartment to the foot chute;
      (b) release of the food dispensing handle from its actuated state moves the shut off cover to open the path between the food measurement compartment and the food storage chamber thereby permitting the food measurement compartment to be refilled from the food storage chamber; and
   the second chamber further comprising one or more storage compartments disposed below the food measurement chamber.

2. The apparatus of claim 1 wherein the shut off cover is disposed between the food storage chamber and food measurement compartment.

3. The apparatus of claim 1 wherein the means for raising the food in the food storage chamber is automatic.

4. The apparatus of claim 3 wherein the elevating means is a calibrated spring.

5. The apparatus of claim 1 wherein the food chute is connected to a food chute release.

6. The apparatus of claim 5 wherein the food dispensing handle and food chute releasably engage to open the food chute.

7. The apparatus of claim 1 wherein the volume adjusting means comprises a dial adjustment and lift mechanism.

8. An apparatus for pet food and pet-related item storage comprising:
a base;
a wall surrounding the base and extending from the base upward in a vertical direction to define an interior chamber;
a divider inside the interior chamber and extending upward in a vertical direction to divide the interior chamber into first and second chambers, said first and second chamber extending parallel to each other from the base to the top of the wall surrounding the base, the first chamber comprising a food storage chamber and the second chamber comprising a food measurement compartment, the food storage chamber with a top opening;
a means for automatically raising food in the food storage chamber to the top opening based on the amount of food therein;
the food measurement compartment connected by a path to the top opening of the food storage chamber, the food measurement compartment being disposed below the top opening of the food storage chamber for receiving food therefrom;
a food chute connected to the food measurement compartment for dispensing food therefrom;
a means for adjusting volume in the food measurement compartment;
a shut off cover between the food storage chamber and food measurement compartment;
a food dispensing handle operatively connected to the shut off cover such that:
    (a) actuation of the food dispensing handle moves the shut off cover to separate the food measurement compartment from the food storage chamber and, after the food measurement chamber has been so separated, dispenses food from the food measurement compartment to the foot chute;
    (b) release of the food dispensing handle from its actuated state moves the shut off cover to open the path between the food measurement compartment and the food storage chamber thereby permitting the food measurement compartment to be refilled from the food storage chamber and actuating the means for automatically raising food.

9. The apparatus of claim 8 wherein the means for automatically raising food in the food storage chamber is automatic.

10. The apparatus of claim 9 wherein the means for automatically raising food is a calibrated spring.

11. The apparatus of claim 8 wherein the food chute is connected to a food chute release.

12. The apparatus of claim 11 wherein the food dispensing handle and food chute releasably engage to open the food chute during actuation of the food dispensing handle.

13. The apparatus of claim 8 wherein the means for adjusting volume comprises a dial adjustment and lift mechanism.

* * * * *